Oct. 23, 1962  T. M. FRISBY  3,059,707
METHOD AND APPARATUS FOR ORIENTING CORES
Filed Oct. 2, 1959   2 Sheets-Sheet 2
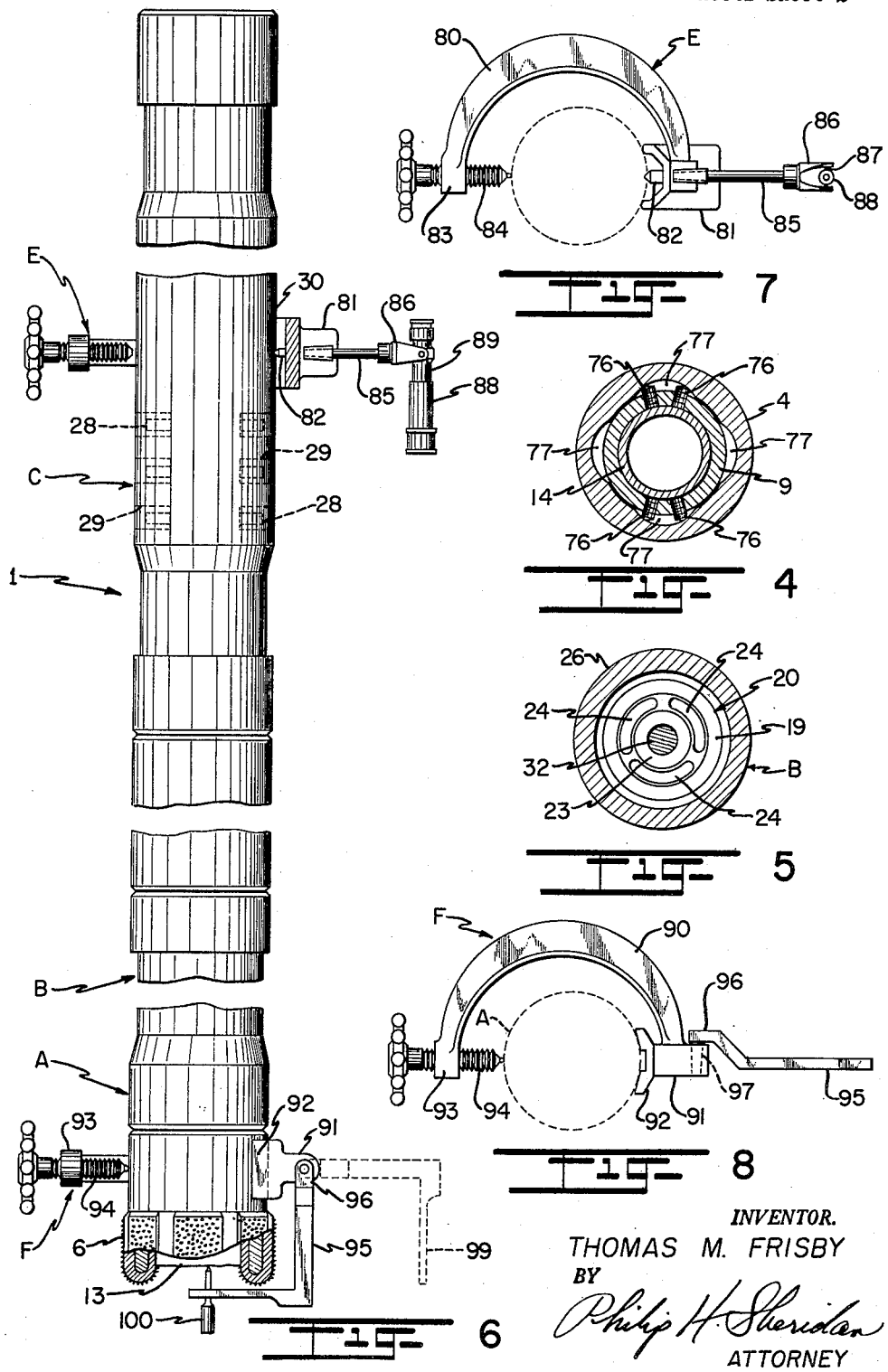
INVENTOR.
THOMAS M. FRISBY
BY
Philip H. Sheridan
ATTORNEY

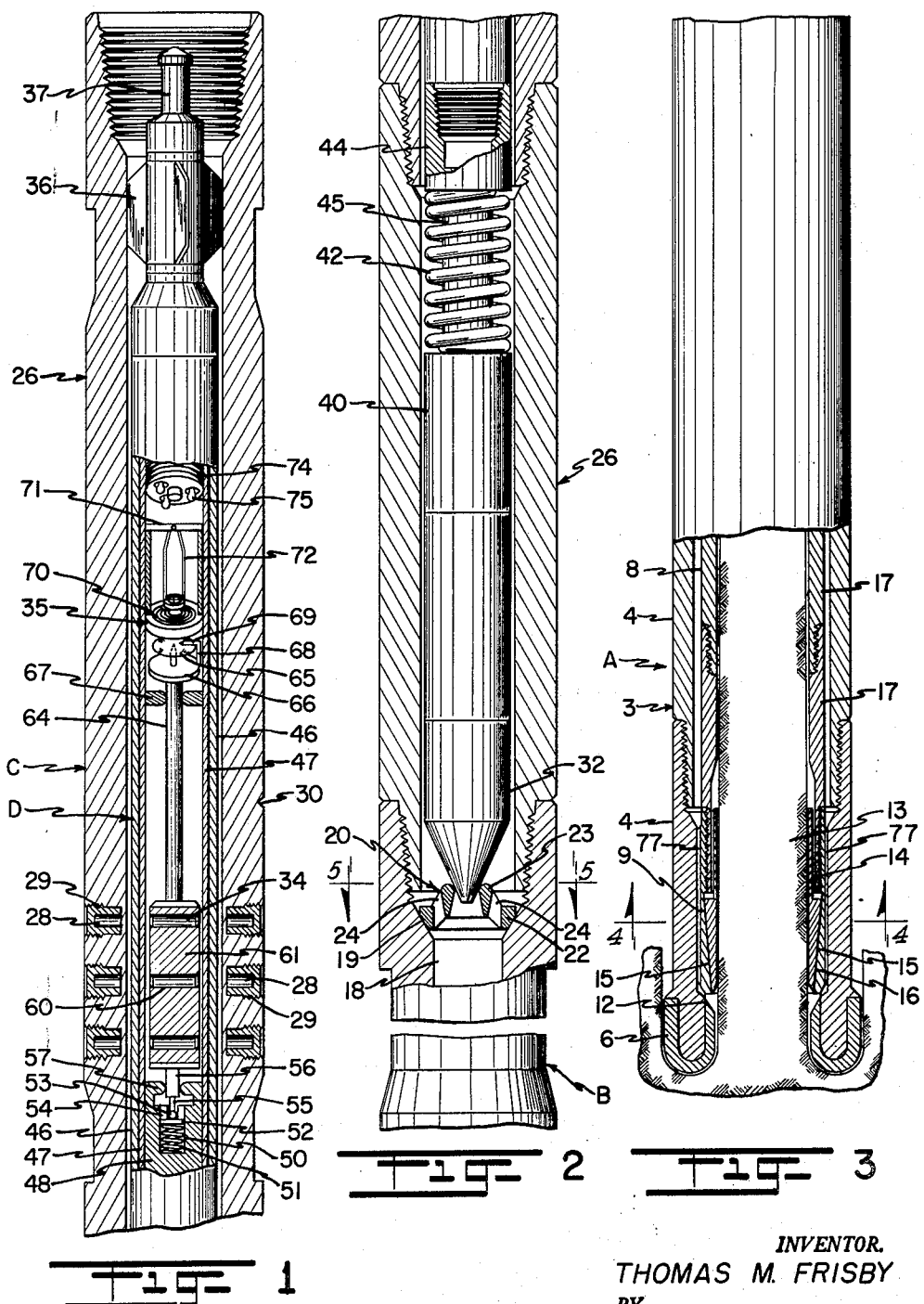

United States Patent Office 3,059,707
Patented Oct. 23, 1962

3,059,707
METHOD AND APPARATUS FOR ORIENTING CORES
Thomas M. Frisby, Denver, Colo., assignor to Eastman Oil Well Survey Company, Denver, Colo., a corporation of Delaware
Filed Oct. 2, 1959, Ser. No. 844,115
5 Claims. (Cl. 175—44)

This invention relates to a novel and improved method and apparatus for orienting cores taken from a subsurface formation to enable an accurate determination of the dip and strike of the formation, and more particularly relates to a method and apparatus for orienting a core with respect to compass direction and bore hole inclination subsequent to removal from the formation.

In taking core samples from a formation it is highly desirable to accomplish this operation in a minimum amount of time so as not to suspend normal drilling operations too long and nevertheless obtain a good representative sample of the formation using conventional and reliable coring equipment; also to obtain complete and accurate information relative to the dip and strike of the formation and this is done by properly orienting the core relative to the compass direction and inclination of the bore hole when the core is displaced from the formation. The above may be most effectively accomplished if orientation of the core is separated from the actual removal operation so that conventional coring methods may be employed without necessitating consideration of proper alignment and orientation of the core at that time, followed by removal of the core from the bore hole at which time prior to breakdown of the coring equipment the core is properly scribed or otherwise marked in such a way as to be correlated with the well survey record.

Accordingly, it is a primary object of the present invention to provide for an improved method and apparatus to carry out the accurate orientation of a core so that the dip and strike of the formation can be easily and accurately determined therefrom.

It is another object to provide for a novel and improved method and apparatus for orienting a core taken from a subsurface formation subsequent to removal therefrom and independently of the coring and survey operations.

It is a further object to provide for the complete and accurate orientation of a core sample of a subsurface formation with respect to inclination and compass direction subsequent to removal of the core from the formation and bore hole whereby conventional coring and survey apparatus may be employed without consideration of orientation of the core.

It is still a further object to provide for a way of orienting a core to determine the dip and strike of a subsurface formation in such a way that a common reference point may be established to accomplish alignment of the core sample taken with respect to the inclination and compass direction recorded subsequent to removal of the core from the formation.

The method and apparatus designed to carry out the present invention will be hereinafter described, together with other features, and they will be more readily understood from a reading of the following specification and by reference to the accompanying drawings forming a part thereof, wherein an example of the invention is shown and wherein:

FIGURE 1 is a longitudinal view in section illustrating the upper portion of an apparatus forming a part of the core orientation assembly in accordance with the present invention;

FIGURE 2 is a longitudinal view partly in section of the intermediate portion of the apparatus located immediately below that shown in FIGURE 1;

FIGURE 3 is another longitudinal view, partly in section, of the lower portion of the apparatus located immediately below that shown in FIGURE 2, all forming a part of the core orientation assembly of the present invention;

FIGURE 4 is a cross sectional view taken along the lines 4—4 of FIGURE 3;

FIGURE 5 is a sectional view taken along the lines 5—5 of FIGURE 2;

FIGURE 6 is an elevational view of the core orientation assembly including a scribing device mounted therein subsequent to removal from the well bore;

FIGURE 7 is a plan view of the upper aligning clamp forming a part of the preferred form of the scribing device; and FIGURE 8 is a plan view of the preferred form of lower aligning clamp forming a part of the scribing device shown in FIGURE 6.

Referring more particularly to the drawings, there is shown for the purposes of illustration and not limitation in the figures a core orientation assembly generally represented at 1 in FIGURE 6, and the complete system is broadly comprised in ascending order of a core barrel section A, an extension sub B, a non-magnetic pup joint C disposed for suspension at the lower end of a drill pipe, not shown, an instrument assembly section D housed within the joint C, and a scribing device made up of an upper aligning clamp E and lower aligning clamp F removably disposed on the core orientation assembly.

As shown in FIGURES 1-3, when the core orientation assembly 1 is suspended in a well bore, the scribing device as shown in FIGURE 6 is removed therefrom, and in this connection the general construction and arrangement of the sections forming the core orientation assembly with the exception of the scribing device are in themselves well known. Accordingly the respective sections shown in FIGURES 1-3 will be just briefly described, with the understanding that various substitutions and changes may be made in the assembly without departing from the scope of the invention.

In order to drill into the formation and remove a core sample therefrom, the core barrel section A includes an outer barrel 3 formed of a plurality of tubular sections 4 with the length and number of tubular sections being dictated by the length of core which is to be drilled and removed from the formation, and for example the tubular sections may extend for as much as sixty or more feet. Connected to the lower end of the barrel 3 is a core bit 6 of the diamond type, although other suitable types may be employed such as a rotary, rock or drag type of bit in accordance with conventional practice. Spaced within the outer barrel 3 is an inner or core receiving barrel 8 and the barrel 8 is comprised also of a number of tubular sections connected together by fittings to thus provide the desired length of barrel in accordance with the length of the outer barrel 3. Threaded onto the lower end of the barrel 8 is a collar 9 providing an outer, conical surface generally corresponding to the slope of a conical inner surface 12 at the lower end of the barrel 3 adjacent the point of connection of the core bit 6.

To establish gripping engagement with a core 13 for selective removal from the formation, a core catcher 14, commonly referred to as the "slip type," is positioned within the collar 9 for inward adjustable extension therefrom. The core catcher has a generally conical exterior configuration as indicated at 15 which mates with a corresponding inner conical surface 16 on the collar 9. Thus, as the core bit 6 drills through the formation the core 13 in moving upwardly through the inner barrel 8 will cause the core catcher 14 to slide upwardly and outwardly in relation to the collar so as not to impede the upward movement of the core through the inner barrel. However, by raising the core barrel section with respect to the core, the core catcher, which yieldingly engages the core, will be caused to move relatively downwardly and inwardly along the conical surface 16 of the collar to exert a strong clamping action upon the core 13. Continued upward movement of the core barrel with respect to the core will then cause the core catcher to engage the core with still greater pressure whereupon the core will be broken off for removal from the formation.

Threaded onto the upper end of the core section A is the extension sub B forming a restricted axial passage 18 extending upwardly into an annular seat portion 19 which is formed for disposition of a "tell-tale" baffle plate 20 thereon. The baffle plate 20 is preferably in the form of a spider and serves as the lower support member for the instrument assembly section D. The baffle plate 20 also operates to determine the relative alignment between the members comprising the instrument assembly D and pup joint C and to this end the baffle plate is made up of an outer concentric ring portion 22 engaging with the seat 19 together with spaced, inner concentric ring portion 23 which is connected in raised disposition relative to the outer ring 22 by means of spaced radially extending ribs 24. Due to the spacing of the ribs 24 drilling fluid is accordingly free to pass downwardly between the ribs through the restricted passage 18 into the lower core barrel section A so as to provide for removal of the cuttings and dissipation of heat during the coring operation.

The pup joint C is made up on the upper end of the extension sub B and is also comprised of a number of tubular sections 26 forming a housing for accommodation of the instrument assembly D therein. In addition, the pup joint has positioned thereon in predetermined spaced relation above the tell-tale baffle plate 20 a series of vertically spaced face magnets 28. The magnets are preferably disposed in vertically spaced relation on diametrically opposed sides of the pup joint and with each magnet being inserted within a threaded nipple 29 for disposition within a recess in the wall of the pup joint. Also spaced above the magnets in vertically aligned relation on one side of the joint C is a notch 30 which serves with the magnets as a reference point to carry out the alignment of the instrument assembly with respect to the scribing device employed in orienting the core. In turn the instrument assembly D is made up into a number of subsections including a landing nose 32 at the lower end thereof, a shock absorber 40 to cushion the impact of the landing nose 32 as it strikes the baffle plate 20, vertically spaced magnets 34, a survey instrument apparatus 35, and stabilizers 36 disposed at the upper end of the assembly along with a fishing head 37 to provide for connection of suitable means for lowering the instrument assembly through the drill pipe into position within the pup joint section C.

The landing nose 32 is uniformly downwardly tapered to slide into engagement with the ring portion 23 and to insure centered disposition of the instrument assembly within the pup joint. The shock absorber 40 is mounted in direct threaded connection with the landing nose and is made up of a plurality of tubular sections 40, there being provided an inner compression spring, not shown, in a central bore within the lower tubular section 40 and a spring 42 mounted in outer concentric relation on a stem 45 which extends into the fitting 44. Upon impact exerting an upward force against the landing nose 32 the stem 45 will be caused to move downwardly against the inner spring within the lower section 40 while at the same time the upper tubular section 40 will move upwardly in relation to the stem causing compression of the spring 42 so as to effectively absorb impact applied against the landing nose.

Connected into the fitting 44 is the instrument assembly proper comprised of an outer barrel 46, preferably composed of brass, and an inner concentric sleeve 47, preferably of aluminum, enclosing therein a bearing portion 48 for swiveled disposition of the magnets 34 and survey apparatus 35. The bearing portion 48 is recessed at the upper end thereof to provide a lower receptacle 50, in which is mounted a spring 51, a solid plate 52 supported at the upper end of the spring, with a ball 53 centered on the plate by means of an annular flange 54 projecting inwardly at the upper end of the receptacle. Extending downwardly through the restricted opening formed by the flange 54 is a pin 55 to contact the spring mounted ball 53 so as to be freely rotatable thereon and to be capable of limited reciprocal movement so as to prevent jarring of the assembly proper. Extending upwardly from the pin 55 is a relatively large cylindrical portion 56 which is also centered within the bearing portion by means of an inwardly projecting annular flange 57 disposed in spaced relation to the flange 54.

The magnets 34 are inserted within horizontal extending bores 60 arranged in vertical spaced relation within cylindrical portion 61, the latter forming an upward extension of the pin 55 and cylindrical member 56. Due to the swiveled disposition of the pin within the bearing portion 48, the magnets 34 are accordingly free to align themselves with the diametrically opposed magnets 28. The survey instrument 35 is also made to rotate with the magnets 34 through a connecting rod 64 projecting upwardly from the top of the cylinder 61. The survey instrument 35 is in itself well known and is preferably comprised of conventional instruments including a magnetic compass 65 supported by well known means 66 positioned on the rod 64 and it will be seen that the compass 65 and means 66 are centered in relation to the barrel 46 and sleeve 47 by guides 67 projecting inwardly from the sleeve 47. Extending upwardly from the outer edge of the plate 66 in vertical alignment with the magnets 34 is a magnetic position indicator 68 including a horizontal arm 69 extending across the top surface of the compass. The position indicator is of course free to follow the movement of the magnets 34 as they are brought into horizontal aligned relation with the face magnets 28 so as to establish a direct correlation between compass direction and the magnets 28.

Spaced above the magnetic compass 65 is a glass ring 70 provided with a plurality of concentric markings thereon, and spaced above the ring 70 is positioned a suitable support 71 for a plumb bob arrangement 72 pivotally supported thereon. To record the relative disposition of the position indicator with respect to the compass markings and also the inclination of the bore hole as reflected by the projection of the image of the plumb bob onto the compass through the glass ring 70, a camera unit 74 including a light source 75 is mounted above the compass and plumb bob arrangement to project the information onto a single film or record disc, and of course the manner of making a single or multiple shot survey such as this is well known in the art. It is to be noted, however, that the record disc will also reflect the relative disposition of the position indicator with respect to the compass markings to thereby provide a reference line correlating the compass position with the face magnets 28 and notch 30. Other suitable means, not shown, but for example including a surface watch is of course provided in connection with the operation of the survey instrument so that with the instrument assembly in position, recording of the survey information may be synchronized with the coring operation essentially for the purpose of providing a photographic record of the compass direction and bore hole inclination prior to breaking the core loose from the formation.

Once a photographic recording is made of the survey apparatus and the core is broken loose from the formation, the assembly may be removed from the bore hole whereupon resumption of drilling operations may take place. Upon removal the scribing device of the present invention is utilized to provide a reference marking on the core prior to removal of the core from the assembly, since the core remains aligned with the face magnets 28 on the pup joint and in turn with the position indicator 68. Stated another way, by scribing the core in alignment with the position indicator through the face magnets 28, the position indicator marking which has its image projected onto the compass surface when the recording disc is made is representative of the original disposition of the core with respect to the surrounding formation as pertains to compass direction and inclination. To this end, the scribing device is defined by the aligning members E and F wherein essentially the upper aligning member E is designed to provide a support for disposition in alignment with the face magnets or other reference point on the pup joint of a correlating means from which the lower aligning member F may be similarly positioned in alignment with the reference point on the pup joint for scribing or marking of the core. To establish disposition of the upper aligning member E, the notch 30 serves as a reference point which is in a plane passing through the center line of the vertically spaced magnets 28. Aligning member E is preferably provided with a C-shaped body 80 having an enlarged end portion 81 which serves as a support member and guide for a centering pin 82 projecting radially inwardly with respect to the C-shaped body 80. At the opposed end of the body 80 there is provided an opening in 83 for threadedly receiving a screw member 84 which engages the pup joint in diametrically opposed relation to the centering pin 82 to clamp the pin in position. Projecting outwardly and on a common axis with the centering pin is a support rod 85 having a bifurcated end fitting 86 with inwardly projecting bearings 87 from which is suspended a sight glass 88 perpendicular to the longitudinal axis of the centering pin 82 and support rod 85. The sight glass 88 may be of any suitable type, such as to establish and enable vertical alignment of the lower aligning member F with the reference point 30 on which the pin 32 is centered. Due to the variable length of each core barrel and pup joint, it is preferred to provide an adjustable optical system such as by means of telescopic member 89 to enable proper focusing of the sight glass with respect to the lower aligning member. Of course, other various suitable types of sighting instruments may be employed so long as proper alignment may be established between the respective aligning members E and F.

The lower aligning member F is similarly made up of a C-shaped body portion 90 provided with a first enlarged end portion 91 having an arcuate flange 92 for engagement with the exterior surface of the core barrel and with the opposite end of the body 90 again forming an enlarged opening in 93 for threadedly receiving screw member 94 to establish adjustable clamping engagement of the aligning member with the exterior surface of the core barrel. Journaled to the outer end of the end portion 91 for swinging movement in a vertical plane is an outwardly extending arm 95 having an offset portion 96 at its inner end with a tapered shaft 97 extending at right angles to the arm for frictional rotatable connection to the end portion 91 so as to enable tightening and positioning of the arm 95 in the desired relation to the core barrel. Also extending downwardly at a right angle to the arm 95 is a holder 99 provided with a longitudinal slot, not shown, in which scribing pen 100 is positioned, this arrangement being similar to that shown and disclosed in Brady Patent No. 2,735,652. It will thus be evident that by positioning the arm 95 to extend horizontally from the end portion 91 the lower alignment member F may be clamped into vertical alignment by centering the arm 95 through the sight glass 88. Once clamped in position, it is then only necessary to loosen the tapered shaft 97 and permit downward swinging movement of the arm and holder to a position underneath the core bit and core sample whereupon a scribe or reference line may be marked on the bottom of the core sample by means of the pen 100. In this way the bottom of the core is scribed or marked in line with the face magnets 28 and also with the position indicator 68. Following breakdown of the assembly and removal of the instrument and core from the pup joint and core barrel respectively, orientation of the scribe line on the core may be made with the reference line of the position indicator on the record disc for the purpose of determination of dip and strike of the formation, all of which may be accomplished through a suitable reading device.

A typical reader which may be employed is the Corex reader manufactured by Eastman Oil Well Survey Company and which is described in detail in Eastman Catalog 59—60. Just briefly, to describe the manner of operation of the reader, the core and record disc are positioned in the reader with the reference line formed by the position indicator aligned with the scribe line on the core. The alignment of the core in definite relationship with the record disc thus effectively denotes the original disposition of the core in the formation from which the dip and strike of the bedding planes in the formation may be easily determined by suitable measuring instruments on the reader by correlation with inclination of the bore hole and compass direction.

In operation the non-magnetic pup joint C with insert magnets 28 and extension sub B with baffle plate 20 are made up directly above the core barrel A for suspension from the drill pipe and lowering into the bore hole. The instrument assembly D may then be lowered through the drill pipe with the landing nose 32 coming to rest in position on the baffle plate 20 and, as mentioned, predetermined spacing is established between the baffle plate and magnets 28 so that the magnets 34 in the instrument assembly will be positioned in opposed relation to the magnets 28. Then the magnets 34 will be free to rotate until brought into alignment with the magnets 28 and similarly the position indicator is rotated into alignment with the face magnets and reference point established by the notch 30. With the instrument assembly in position, the coring operation may be carried out until just before expiration of the time interval for recording the information provided by the compass 65 and plumb bob arrangement 72, as determined through the use and setting of the instrument watch at the surface. Rotation and circulation are then suspended for a selected time interval to obtain a photographic record before breaking the core loose from the formation. When the core barrel and pup joint are removed from the bore hole, the scribing device is then of course employed to establish a reference line on the bottom of the core corresponding to the disposition of the face magnet and position indicator as depicted on the photographic record. Accordingly, from the film record there is obtained a direct reading of the magnetic indicator position and hole declination with respect to compass direction.

It will be apparent from the foregoing description of the method and apparatus for orienting a core in definite predetermined relation with respect to recording data taken at the time of, or shortly after, the coring operation that a greatly simplified, efficient and reliable system is provided. Of course, various types of survey instruments may be employed in conjunction with the scribing device and the survey operation together with the coring operation may be carried out completely independently of the scribing operation on the core. In this connection it will be evident that the sight glass or other suitable means employed to align the scribing pen may be positioned on the lower aligning member, if desired and in accordance with the present invention. Moreover, the core orientation may be from either a straight or inclined hole as required and notwithstanding the inclination of the hole it is only necessary to record a single picture showing the extent of inclination of the hole with respect to the core since the core will have the same relationship at the time the picture is taken with the formation as it has subsequent to removal therefrom. It is further evident that the apparatus of the present invention may be readily adapted also to side-wall coring if desired and essentially the same steps will be followed in such an operation.

It is therefore to be understood that the foregoing disclosure and description of the present invention is merely illustrative and explanatory thereof, and that various changes in the size, shape and materials, as well as in the details of the illustrated construction and described method may be made within the scope of the appended claims without departing from the spirit of the invention.

What is claimed is:

1. A method for orienting a core with respect to compass direction and bore hole inclination, comprising the steps of providing a core apparatus at the lower end of a drill pipe to drill a core sample, simultaneously recording compass direction and inclination of the core with respect to a reference point on the coring apparatus prior to removal of the core sample from the formation, removing the core and coring apparatus from the formation, then scribing the core to correspond with the reference point following removal from the formation but prior to removal from the coring apparatus where upon displacement of the core from the coring apparatus the scribe on the core is oriented in relation to the recording of compass direction and inclination.

2. A method for orienting a core taken from a subsurface formation with respect to compass direction and bore hole inclination, comprising the steps of providing a coring apparatus at the lower end of a drill pipe to drill a core, simultaneously lowering the coring apparatus and an instrument assembly through the drill pipe to simultaneously record in one operation compass direction and inclination of the core with respect to a reference line correlated with a selected reference point on the drill pipe, removing the core from the formation, positioning an aligning member on the drill pipe in predetermined relation to the reference point thereon, positioning a scribing member on the coring apparatus in alignment with the aligning member, then scribing the core to correspond with the reference point following removal from the formation but prior to removal from the coring apparatus where upon displacement of the core from the apparatus the scribe on the core may be oriented in relation to the recording of the reference line with respect to compass direction and inclination.

3. Apparatus for orienting a core subsequent to removal from a subsurface formation comprising a core barrel, an extension sub including a baffle plate thereon, a housing including a reference point and a series of vertically spaced horizontally directed face magnets disposed in predetermined relation above said baffle plate, an instrument assembly adapted to be lowered into said housing for disposition on said baffle plate including a bearing member, a series of vertically spaced magnets carried on said bearing member for swiveled movement opposite the face magnets so as to become aligned therewith, a survey instrument including a position indicator carried on said bearing member for rotation with the magnets in said assembly with means to record the alignment of said position indicator with respect to compass direction and bore hole inclination as reflected by said survey instrument, and a scribing device including a first aligning member having a sight member thereon positioned in alignment with the reference point on said housing and a second alignment member disposed on said core barrel including a scribing member journaled for movement from a position to establish vertical alignment with the reference point through said sight member into a position to provide for marking the core so as to orient it with respect to the position indicator prior to removal from the core barrel.

4. Apparatus for simultaneously orienting a core being removed from a subsurface formation with respect to compass direction and bore hole inclination comprising, means for drilling and removing a core from the formation, an instrument assembly housing having an exterior reference point thereon, a support member at the lower end of said housing, an instrument assembly having means for recording compass direction and bore hole inclination together with a position indicator and means to record the alignment of said position indicator with respect to compass direction and bore hole inclination, said instrument assembly being removably disposed in said housing for disposition on said support member with aligning means in said instrument assembly and said housing to align said position indicator with the reference point on said housing whereby direct correlation is established between the reference point on said housing and compass direction, and scribe means including an aligning member positioned in alignment with the reference point on said housing and a scribing member secured to said drilling means in predetermined aligned relation with said aligning member for marking each core removed from the formation in alignment with the reference point on said housing thereby to orient the core in relation to the recording of compass direction and bore hole inclination.

5. Apparatus according to claim 4 wherein said housing is formed of nonmagnetic material, said aligning means in said instrument assembly and said housing are defined by magnet members, and said instrument assembly being disposed within said nonmagnetic housing at a location away from the influence of said magnet members.

References Cited in the file of this patent

UNITED STATES PATENTS

| | | |
|---|---|---|
| 2,190,790 | Humphreys | Feb. 20, 1940 |
| 2,657,013 | Brady | Oct. 27, 1953 |
| 2,735,652 | Brady | Feb. 21, 1956 |